(12) United States Patent
Kuo

(10) Patent No.: US 8,858,093 B2
(45) Date of Patent: Oct. 14, 2014

(54) OPTICAL CONNECTOR HAVING HIGH COUPLING PRECISION

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 19 days.

(21) Appl. No.: 13/744,422

(22) Filed: Jan. 18, 2013

(65) Prior Publication Data

US 2014/0169744 A1   Jun. 19, 2014

(30) Foreign Application Priority Data

Dec. 19, 2012   (CN) .................................. 101148291

(51) Int. Cl.
    *G02B 6/36* (2006.01)
    *G02B 6/32* (2006.01)
    *G02B 6/38* (2006.01)
    *G02B 6/42* (2006.01)

(52) U.S. Cl.
    CPC ............ *G02B 6/4292* (2013.01); *G02B 6/3869* (2013.01); *G02B 6/4214* (2013.01); *G02B 6/3885* (2013.01); *G02B 6/4246* (2013.01); *G02B 6/3893* (2013.01); *G02B 6/4204* (2013.01); *G02B 6/3897* (2013.01)
    USPC ................... 385/78; 385/33; 385/47; 385/75; 385/81; 385/89; 385/92; 385/93

(58) Field of Classification Search
    CPC .. G02B 6/3869; G02B 6/3885; G02B 6/3893; G02B 6/3897; G02B 6/4201; G02B 6/4292; G02B 6/4204; G02B 6/262; G02B 6/30; G02B 6/26; G02B 6/24; G02B 6/241; G02B 6/4228; G02B 6/4219; G02B 6/4246; G02B 6/4214
    USPC .................. 385/33, 47, 49, 53, 74–78, 88–92
    See application file for complete search history.

(56) References Cited

U.S. PATENT DOCUMENTS 7,118,293 B2 * 10/2006 Nagasaka et al. ............... 385/89

* cited by examiner

*Primary Examiner* — Uyen Chau N Le
*Assistant Examiner* — Michael Mooney
(74) *Attorney, Agent, or Firm* — Novak Druce Connolly Bove + Quigg LLP

(57) ABSTRACT

An optical connector includes a jumper, optical fibers and an optical-electric coupling element. The jumper includes a first side surface and a second side surface. A locating flange extends from the first side surface. The locating flange includes a first vertical surface. The jumper defines receiving holes through the first and second side surfaces and the first vertical surface. Each of the optical fibers is received in a respective receiving hole. The optical-electric coupling element includes a third side surface defining a locating cavity. The locating cavity includes a second vertical surface forming coupling lenses. The locating cavity also includes a lower sidewall and an upper sidewall defining an opening. The second vertical surface is substantially perpendicular to the upper sidewall. The locating flange is inserted into the locating cavity, with each coupling lenses aligned with a respective optical fiber.

12 Claims, 5 Drawing Sheets

OPTICAL CONNECTOR HAVING HIGH COUPLING PRECISION

BACKGROUND

1. Technical Field

The present disclosure relates to optical connectors, and particularly to an optical connector which has a high coupling precision.

2. Description of Related Art

An optical connector includes a laser diode for emitting optical signals, a first optical transmission assembly, a second optical transmission assembly coupled with the first optical transmission assembly, and a photo diode. The optical signals emitted from the laser diode can enter the first optical transmission assembly, and be transmitted through the second optical transmission assembly to the photo diode, and finally can be converted into electrical signals by the photo diode.

The first optical transmission assembly includes a plurality of coupling lenses and the second optical assembly includes a plurality of optical fibers for coupling the coupling lenses to allow optimum signal transmittance. The first optical transmission assembly has to be mechanically and precisely engaged and configured with the second optical transmission assembly via a plurality of positioning holes and positioning posts to ensure the lenses are precisely aligned with the optical fibers. However, it is difficult to consistently align the positioning holes and the positioning posts together, which may result in lowered coupling precision between the coupling lenses and the optical fibers, and thus poor optical signals transmittance.

Therefore, it is desirable to provide an optical connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
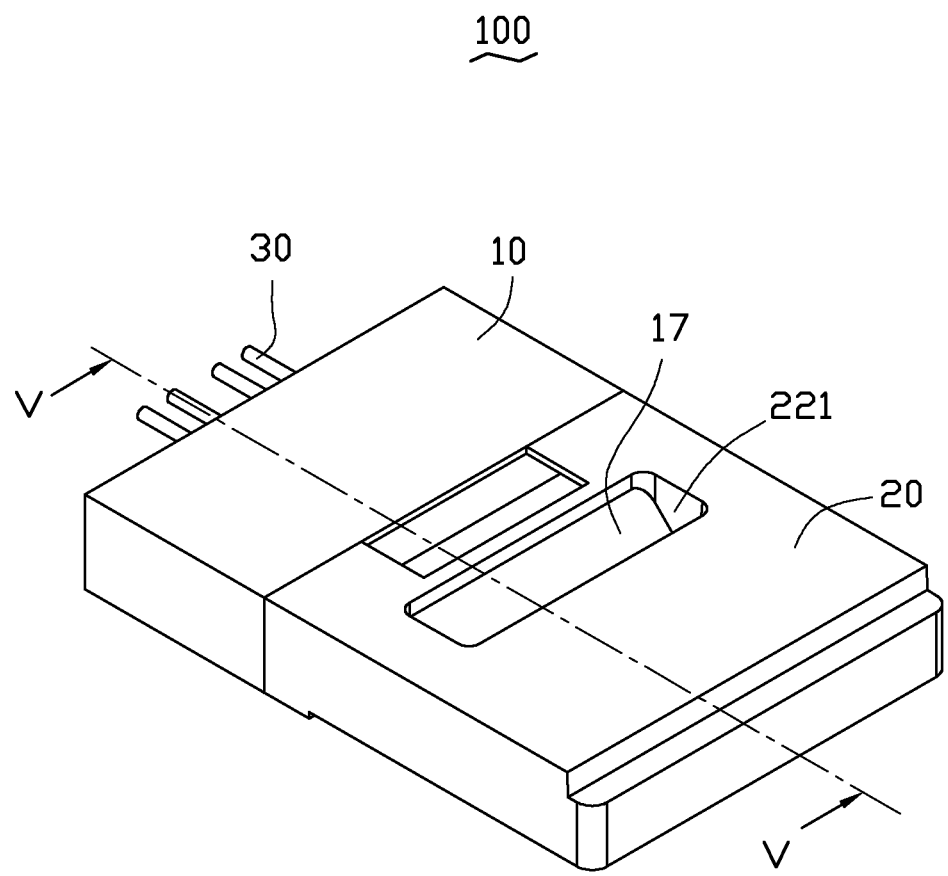
FIG. 1 is an assembled, isometric view of an optical connector, according to an exemplary embodiment.
Figure 2:
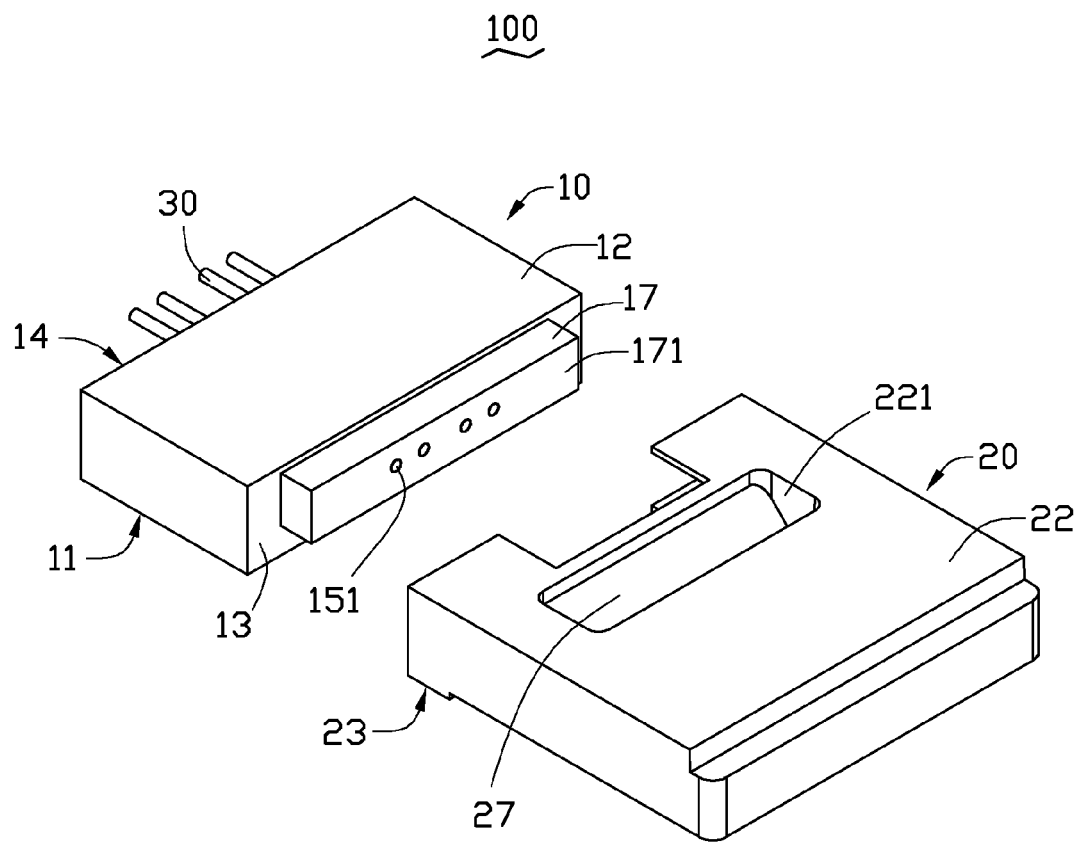
FIG. 2 is an exploded, isometric view of the optical-electric converting module of FIG. 1.
Figure 3:
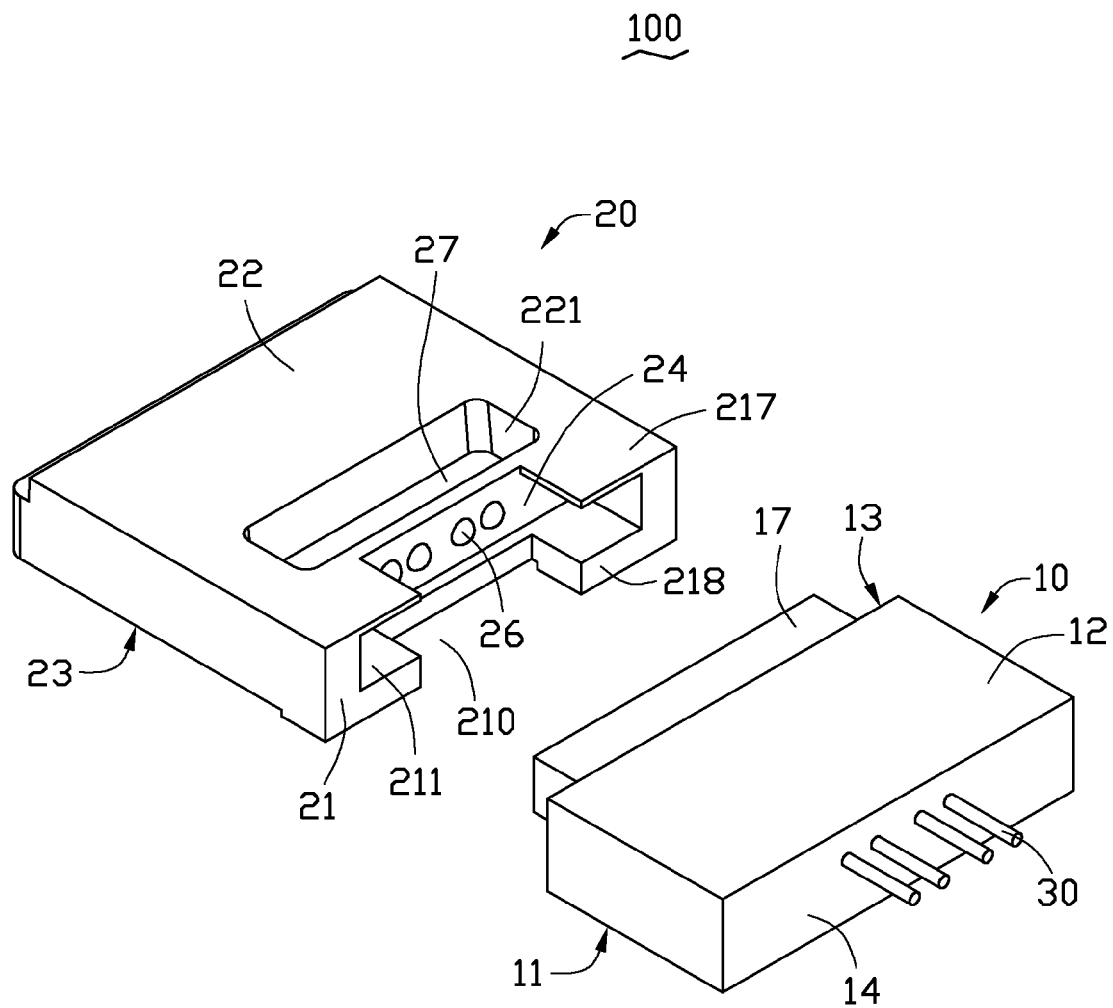
FIG. 3 is similar to FIG. 2, but viewed from another angle.
Figure 4:
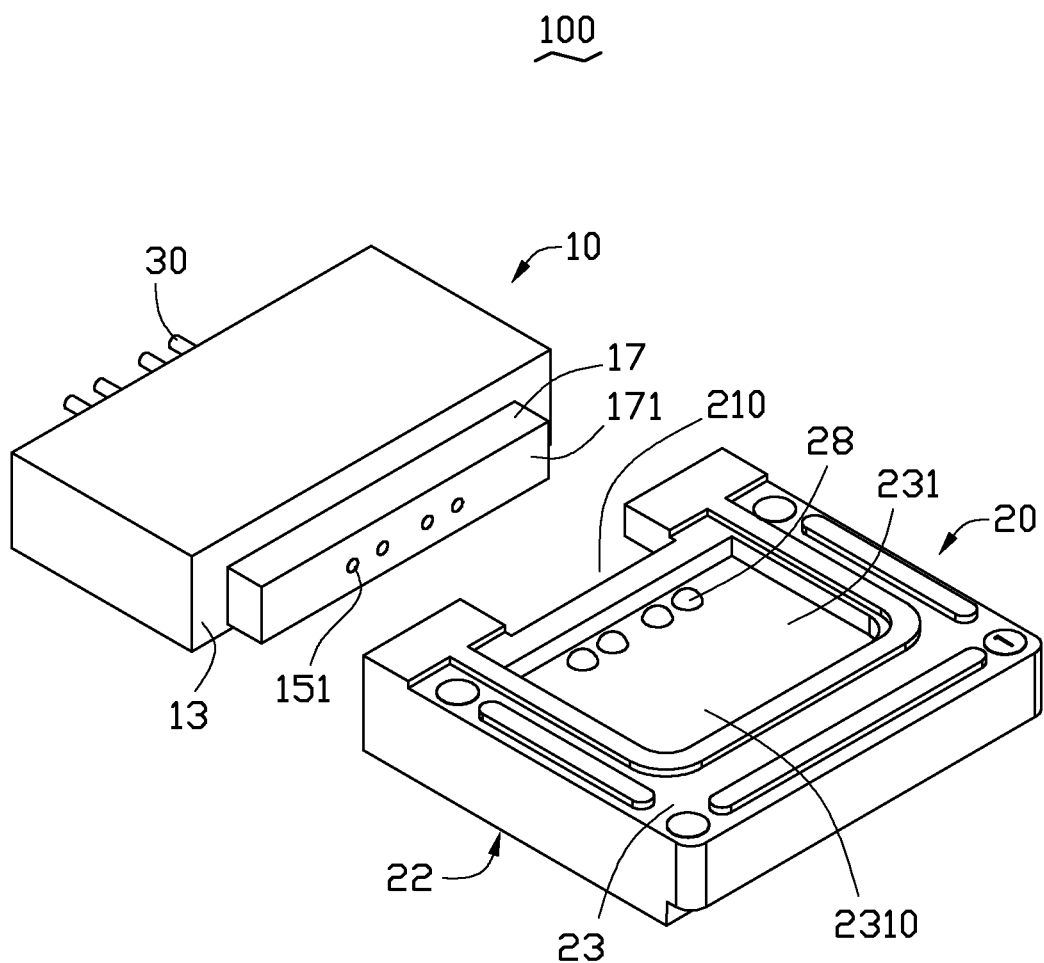
FIG. 4 is similar to FIG. 2, but viewed from another angle.
Figure 5:
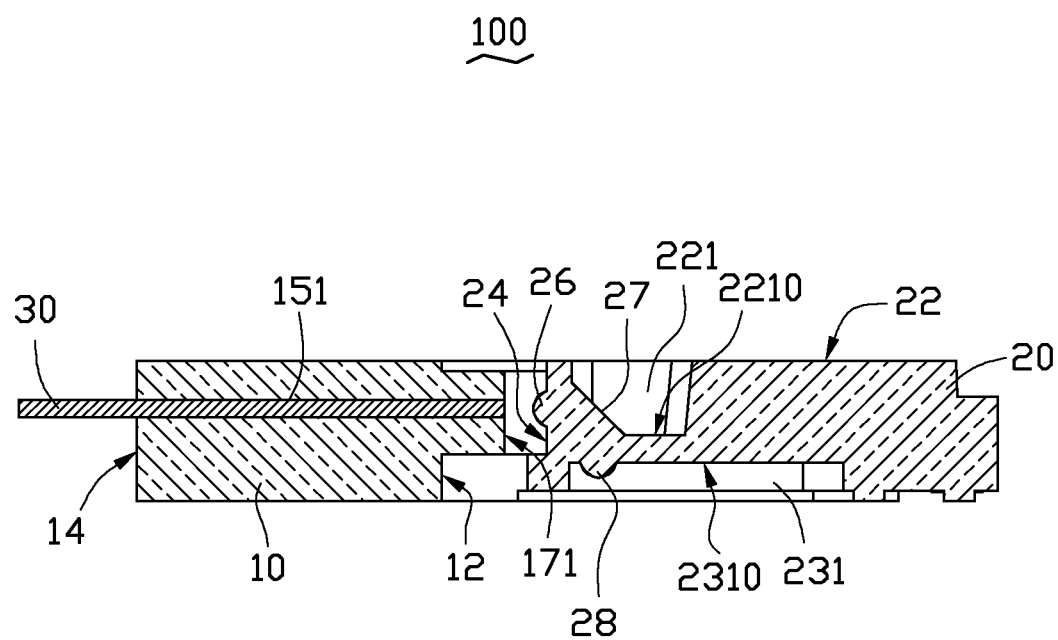
FIG. 5 is a cross-sectional view taken along line V-V of FIG. 1.

FIGS. 1-5 show an optical connector 100, according to an embodiment. The optical connector 100 includes a jumper 10, an optical-electric coupling element 20 detachably connected to the jumper 10, and four optical fibers 30 received in the jumper 10.

The jumper 10 includes a lower surface 11, an upper surface 12 facing away from the lower surface 11, a first side surface 13 and a second side surface 14 facing away from the first side surface 13. The upper surface 12 is substantially parallel with the lower surface 11. The first side surface 13 is substantially parallel with the second side surface 14. The first side surface 21 perpendicularly connects the upper surface 12 to the lower surface 11. The second side surface 14 also perpendicularly connects the upper surface 12 to the lower surface 11.

A locating flange 17 perpendicularly extends upwards from the first side surface 13. The locating flange 17 includes a first vertical surface 171 substantially parallel with the first side surface 13. The jumper 10 defines four receiving holes 151 running through the first side surface 13, the second side surface 14 and the first vertical surface 171. Each of the receiving holes 151 is configured to receive an optical fiber 30.

The optical-electric coupling element 20 includes a third side surface 21, a top surface 22 and a bottom surface 23 facing away from the top surface 22. The top surface 22 is substantially parallel with the bottom surface 23. The third side surface 21 substantially perpendicular to the top surface 22 and the bottom surface 23.

The optical-electric coupling element 20 defines a locating cavity 211 in the third side surface 21. The shape and the size of the locating cavity 211 respectively correspond with the shape and the size of the locating flange 17. In the embodiment, both the locating cavity 211 and the locating flange 17 are rectangular in shape. The depth of the locating cavity 211 is slightly larger than the thickness of the locating flange 17 in a direction parallel with the top surface 22 and perpendicular to the third side surface 21. The locating cavity 211 includes a second vertical surface 24 substantially perpendicular to the top surface 22. The second vertical surface 24 forms four first coupling lenses 26. In the embodiment, all of the first coupling lenses 26 are convex lenses and are integrally formed with the optical-electric coupling element 20. When assembling, the locating flange 17 are inserted into the locating cavity 211 as a pinch fit to firmly attach the jumper 10 into the optical-electric coupling element 20, with each of the first coupling lens 26 being aligned with one of the optical fibers 30.

The locating cavity 211 includes an upper sidewall 217 and a lower sidewall 218 opposite to the upper sidewall 217. The upper sidewall 217 is substantially parallel with the lower sidewall 218, and both substantially parallel with the top surface 22. Both the upper sidewall 217 and the lower sidewall 218 respectively define an opening 210.

The optical-electric coupling element 20 also defines a first cavity 221 in the top surface 22. The first cavity 221 includes a bottom sidewall 2210 and a sloped surface 27 directly connected to the bottom sidewall 2210. The bottom sidewall 2210 is substantially parallel with the top surface 22. An included angle between the bottom sidewall 2210 and the sloped surface 27 is about 45 degrees. An angle between an optical axis of each first coupling lens 26 and the sloped surface 27 is also about 45 degrees.

The optical-electric coupling element 20 defines a second cavity 231 in the bottom surface 23. The second cavity 231 includes a parallel surface 2310 substantially parallel to the top surface 22. The parallel surface 2310 forms four second coupling lenses 28. In the embodiment, all of the second coupling lenses 28 are convex lenses and are integrally formed with the optical-electric coupling element 20. Each of the second coupling lenses 28 corresponds to a first coupling lens 26. An angle between an optical axis of each second coupling lens 28 and the sloped surface 27 is also about 45 degrees. In the embodiment, the second coupling lenses 28 are positioned on the light path from the sloped surface 27.

In other embodiments, the numbers of the first coupling lenses 26, the second coupling lenses 28 and the optical fibers 30 can be changed depending on need.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
   a jumper comprising a first side surface and a second side surface facing away from the first side surface, the jumper comprising a locating flange perpendicularly extending from the first side surface, the locating flange comprising a first vertical surface substantially parallel with the first side surface, the jumper defining at least two receiving holes running through the first side surface, the second side surface and the first vertical surface;
   at least two optical fibers, each of the at least two optical fibers receiving in a respective one of the at least two receiving holes; and
   an optical-electric coupling element comprising a third side surface, the optical-electric coupling element defining a locating cavity in the third side surface, the shape and the size of the locating cavity respectively corresponding with the shape and the size of the locating flange, the locating cavity comprising a second vertical surface, the second vertical surface forming at least two first coupling lenses, the locating cavity also comprising an upper sidewall and a lower sidewall opposite to the upper sidewall, the upper sidewall defining an opening, the second vertical surface substantially perpendicular to the upper sidewall, the locating flange inserted into the locating cavity as a pinch fit to firmly attach the jumper into the optical-electric coupling element, with each of the at least two first coupling lenses being aligned with a respective one of the at least two optical fibers.

2. The optical connector of claim 1, wherein both the locating cavity and the locating flange are rectangular in shape.

3. The optical connector of claim 1, wherein the optical-electric coupling element further comprises a top surface and a bottom surface facing away from the top surface, the top surface is substantially parallel with the bottom surface, the third side surface substantially is perpendicular to the top surface and the bottom surface, and the second vertical surface is substantially perpendicular to the top surface.

4. The optical connector of claim 3, wherein a depth of the locating cavity is slightly larger than a thickness of the locating flange in a direction parallel with the top surface and perpendicular to the third side surface.

5. The optical connector of claim 3, wherein the optical-electric coupling element defines a first cavity in the top surface, the first cavity comprises a bottom sidewall and a sloped surface directly connected to the bottom sidewall, and the bottom sidewall is substantially parallel with the top surface.

6. The optical connector of claim 5, wherein an included angle between the bottom sidewall and the sloped surface is about 45 degrees.

7. The optical connector of claim 5, wherein an angle between an optical axis of each first coupling lens and the sloped surface is also about 45 degrees.

8. The optical connector of claim 5, wherein the optical-electric coupling element defines a second cavity in the bottom surface, the second cavity comprises a parallel surface substantially parallel to the top surface, the parallel surface forms at least two second coupling lenses, each of the at least two second coupling lenses corresponds to a respective first coupling lens, and the at least two second coupling lenses are positioned on a light path from the sloped surface.

9. The optical connector of claim 8, wherein all of the at least two second coupling lenses are convex lenses and are integrally formed with the optical-electric coupling element.

10. The optical connector of claim 8, wherein an angle between an optical axis of each second coupling lens and the sloped surface is about 45 degrees.

11. The optical connector of claim 1, wherein all of the at least two first coupling lenses are convex lenses and are integrally formed with the optical-electric coupling element.

12. The optical connector of claim 1, wherein the lower sidewall of the locating cavity defines another opening.

* * * * *